US009745034B2

(12) United States Patent
Childress et al.

(10) Patent No.: US 9,745,034 B2
(45) Date of Patent: Aug. 29, 2017

(54) WATERBORNE PAYLOAD DEPLOYMENT VESSEL AND METHOD

(71) Applicant: The Boeing Company, Chicago, IL (US)

(72) Inventors: Jamie J. Childress, Mercer Island, WA (US); Marci A. George, Lake Tapps, WA (US); Paul L. Wynns, San Diego, CA (US); Kurt A. Matthews, Fullerton, CA (US); John J. Fagan, Jr., Chalfont, PA (US); Egan Greenstein, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/929,561

(22) Filed: Nov. 2, 2015

(65) Prior Publication Data

US 2017/0120997 A1    May 4, 2017

(51) Int. Cl.
*B63G 8/14* (2006.01)
*B64D 1/02* (2006.01)
(Continued)

(52) U.S. Cl.
CPC ............... *B63G 8/14* (2013.01); *B63B 21/48* (2013.01); *B64D 1/02* (2013.01); *B64D 17/00* (2013.01)

(58) Field of Classification Search
CPC .. B63G 8/14; B64D 1/02; B64D 17/00; B63B 21/48; B64C 35/005; B64C 37/00; B64C 2201/126; B60F 5/02
See application file for complete search history.

(56) References Cited

U.S. PATENT DOCUMENTS

| 4,029,233 A |  | 6/1977 | Widenhofer |
|---|---|---|---|
| 5,379,267 A | * | 1/1995 | Sparks ................ G01V 1/3826 367/18 |

(Continued)

FOREIGN PATENT DOCUMENTS

| EP | 0 145 069 | 6/1985 |
|---|---|---|
| GB | 2 164 607 | 3/1986 |

(Continued)

OTHER PUBLICATIONS

European Patent Office, Extended European Search Report, EP 16 18 1364 (Mar. 9, 2017).

*Primary Examiner* — Anthony Wiest
(74) *Attorney, Agent, or Firm* — Walters & Wasylyna LLC

(57) ABSTRACT

A method for deploying a payload into a body of water using a deployment vessel, the deployment vessel including a hull defining a payload compartment, the method including positioning the payload in the payload compartment of the deployment vessel, the deployment vessel and the payload having a buoyancy, wherein the buoyancy is initially negative, deploying the deployment vessel into the water at a drop zone, wherein the deployment vessel moves horizontally through the water as it submerges vertically downward under a force of gravity, changing the buoyancy to positive after a minimum horizontal distance is established between the drop zone and the deployment vessel, thereby causing the deployment vessel to surface and, after the surfacing of the deployment vessel, opening the hull to release the payload therefrom.

20 Claims, 9 Drawing Sheets

(51) Int. Cl.
   *B64D 17/00*      (2006.01)
   *B63B 21/48*      (2006.01)

(56)           References Cited

U.S. PATENT DOCUMENTS 7,179,145 B2 *   2/2007  Driscoll ............... B63B 21/243
                                                        114/294
  8,408,956 B1     4/2013  Vosburgh
  9,010,678 B1     4/2015  Hiller
  2012/0289103 A1 * 11/2012 Hudson .................. F42B 19/00
                                                         440/38

FOREIGN PATENT DOCUMENTS

GB         2 359 049       8/2001
  KR       100 936 467       1/2010

* cited by examiner

WATERBORNE PAYLOAD DEPLOYMENT VESSEL AND METHOD

FIELD

This application relates to the deployment of waterborne payloads and, more particularly, to vessels and methods for deploying waterborne payloads.

BACKGROUND

Approximately seventy percent of the surface of the Earth is covered with water. Therefore, mankind often seeks to deploy into Earth's waters various waterborne payloads. As one example, scientists often deploy into the oceans various sensors for monitoring conditions (e.g., wind and wave height) and seawater properties (e.g., temperature, pH and salinity). As another example, civilian and military objectives often require the deployment into the oceans of various vehicles, such as autonomous surface vehicles ("ASV") and autonomous underwater vehicles ("AUV").

Waterborne payloads are commonly deployed into the water from watercraft (e.g., boats and ships). To avoid damaging the payload (or at least reduce the likelihood of damaging the payload), the watercraft typically slows or stops during payload deployment, thereby allowing careful placement of the waterborne payload into the water. However, the ability to slow (let alone stop) a watercraft on the high seas is highly dependent on ambient weather conditions. Deployment of a waterborne payload from a watercraft under adverse weather conditions may become impractical without assuming a substantial risk to the watercraft and/or the payload.

Furthermore, because of the vastness of Earth's oceans, waterborne payloads are also deployed into the water from aircraft. The drop from the aircraft and, ultimately, the impact with the water presents the risk of damaging the waterborne payload. The risk of damage due to impact with the water may be mitigated by using a parachute. However, the introduction of a parachute presents the risk of parachute entanglement.

Accordingly, those skilled in the art continue with research and development efforts in the field of waterborne payload deployment.

SUMMARY

In one embodiment, the disclosed deployment vessel may include a hull defining a payload compartment and closeable access to the payload compartment, a control surface connected to the hull, and one or more apparatus or systems for changing a buoyancy of the deployment vessel from an initial negative buoyancy to a subsequent positive buoyancy.

In another embodiment, the disclosed deployment vessel may include a hull having a forward end and an aft end, the hull defining a payload compartment and closeable access to the payload compartment, a ballast releasably connected to the forward end of the hull, a control surface connected to the tail end of the hull and a flotation device connected to the hull, wherein the deployment vessel (including any accompanying payload) is initially negatively buoyant and becomes positively buoyant upon release of the ballast and deployment of the flotation device.

In yet another embodiment, disclosed is a method for deploying a payload into a body of water using a deployment vessel. The deployment vessel may include a hull defining a payload compartment. The method may include the steps of (1) positioning the payload in the payload compartment of the deployment vessel, the deployment vessel and the payload having a buoyancy, wherein the buoyancy is initially negative; (2) deploying the deployment vessel into the water at a drop zone, wherein the deployment vessel moves horizontally through the water as it submerges vertically downward under a force of gravity; (3) changing the buoyancy to positive after a minimum horizontal distance is established between the drop zone and the deployment vessel, thereby causing the deployment vessel to surface; and (4) after the surfacing of the deployment vessel, opening the hull to release the payload therefrom.

Other embodiments of the disclosed waterborne payload deployment vessel and method will become apparent from the following detailed description, the accompanying drawings and the appended claims.

DETAILED DESCRIPTION

Disclosed is a deployment vessel and method for deploying a waterborne payload into a body of water, such as an ocean or a freshwater lake. The deployment vessel may house the waterborne payload, and may initially be negatively buoyant. When dropped into the body of water, the deployment vessel may egress the drop zone by diving under the force of gravity. Once a certain horizontal distance between the drop zone and the deployment vessel has been achieved, the buoyancy of the deployment vessel may be changed from negative to positive, thereby surfacing the deployment vessel. On the surface of the body of water, the payload compartment of the deployment vessel may be opened, thereby deploying the waterborne payload into the body of water.

Figure 1:
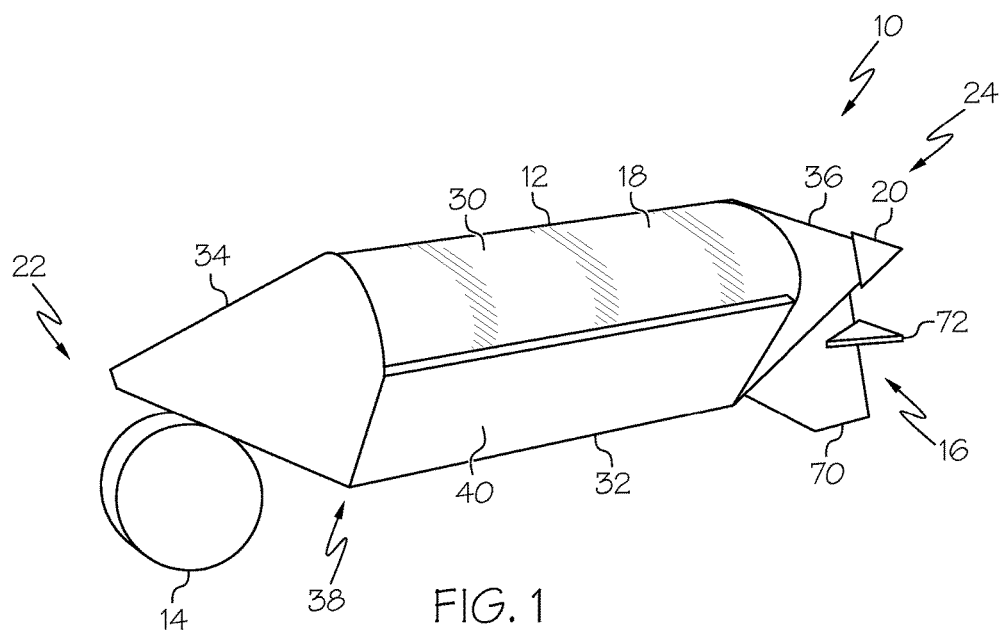
FIG. 1 is a front and side perspective view of one embodiment of the disclosed waterborne payload deployment vessel.
Figure 2:
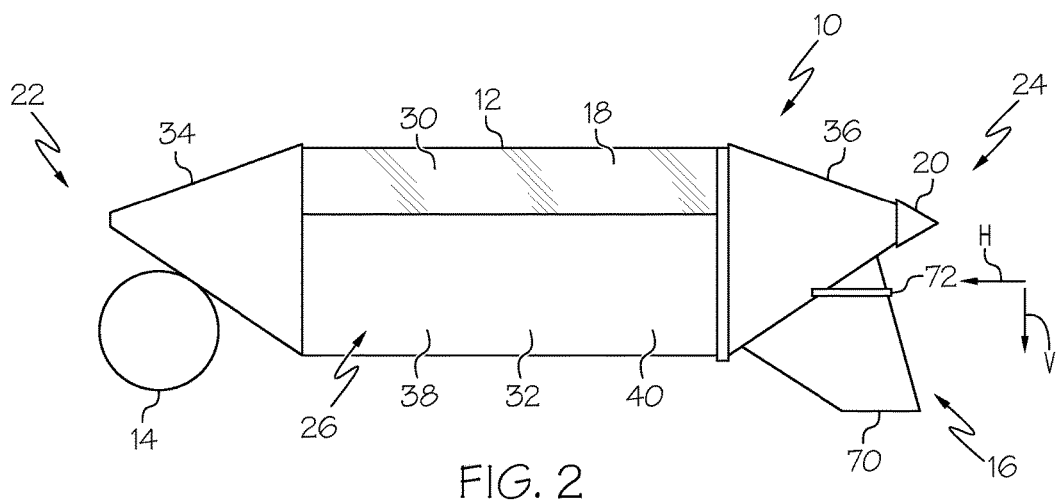
FIG. 2 is a side elevational view of the waterborne payload deployment vessel of FIG. 1.
Figure 3:
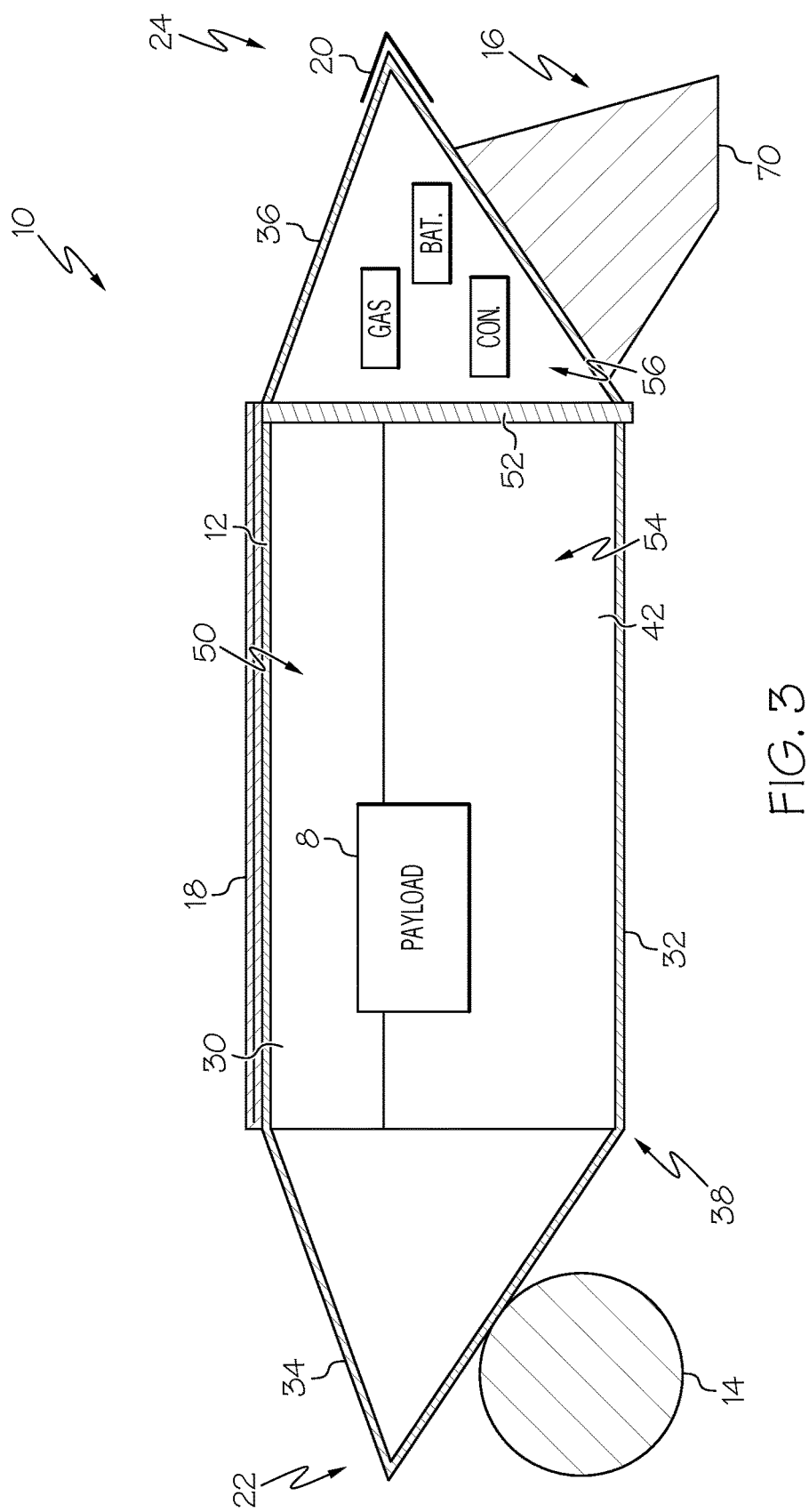
FIG. 3 is a side cross-sectional view of the waterborne payload deployment vessel of FIG. 2.

Referring to FIGS. 1-3, one embodiment of the disclosed waterborne payload deployment vessel, generally designated 10, may include a hull 12, a ballast 14, one or more control surfaces 16, a flotation device 18 and a sea anchor 20. A waterborne payload 8 (FIG. 3), such as a sensor, a watercraft (e.g., an autonomous surface vehicle ("ASV") or an autonomous underwater vehicle ("AUV")) and/or munitions, may be housed within the hull 12 of the deployment vessel 10.

Figure 5:
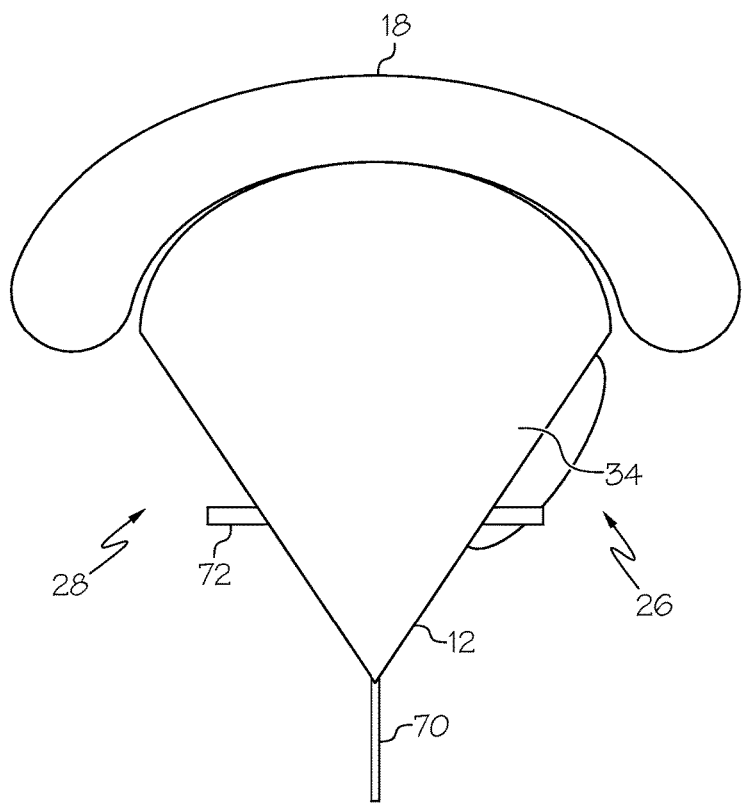
FIG. 5 is a front elevational view of the waterborne payload deployment vessel of FIG. 4.

The hull 12 of the deployment vessel 10 may define a forward end 22, an aft end 24 a port side 26 (shown in FIG. 2) and a starboard side 28 (FIG. 5). The hull 12 may include an upper hull portion 30, a lower hull portion 32, a nose portion 34 and a tail portion 36. Portions of the lower hull portion 32, the nose portion 34 and the tail portion 36 of the hull 12 may define a keel 38, which may extend from proximate (at or near) the forward end 22 of the hull 12 to proximate the aft end 24 of the hull 12.

Figure 6:
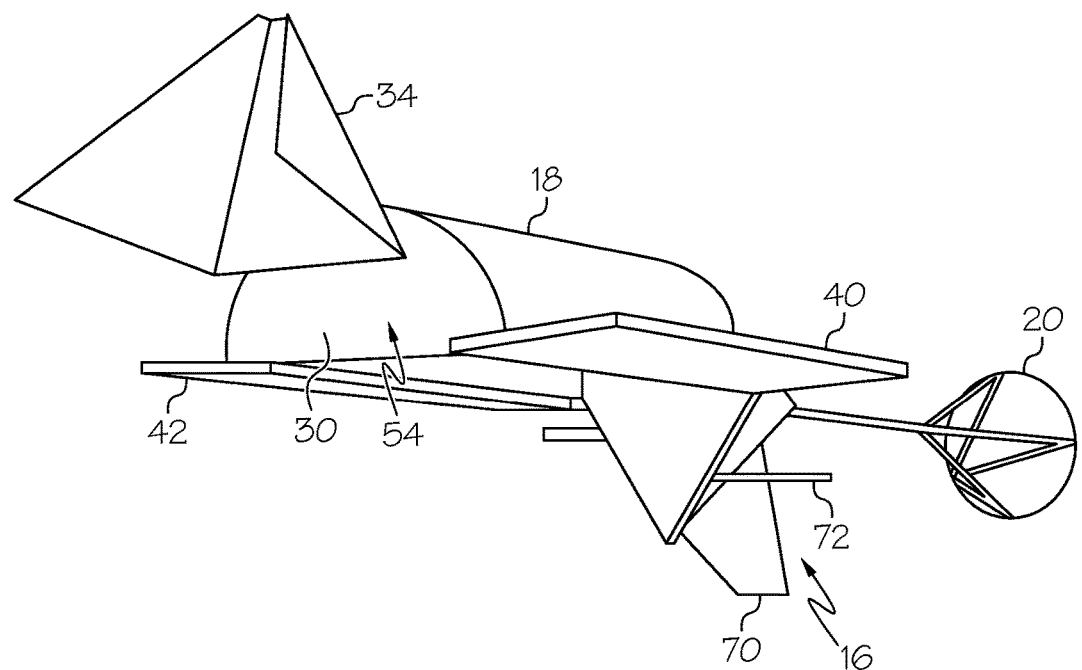
FIG. 6 is a front and side perspective view of the waterborne payload deployment vessel of FIG. 1, shown in a post-payload-deployment configuration.
Figure 7:
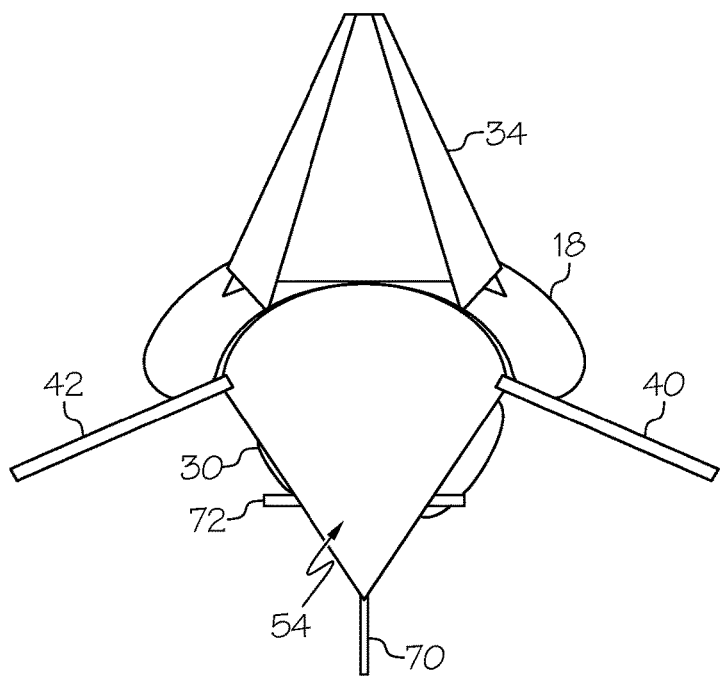
FIG. 7 is a front elevational view of the waterborne payload deployment vessel of FIG. 6.

The lower hull portion 32 of the hull 12 may include a first door 40 hingedly connected to the port side 26 of the upper hull portion 30, as best shown in FIGS. 1 and 2. The lower hull portion 32 may further include a second door 42 hingedly connected to the starboard side 28 of the upper hull portion 30, as best shown in FIG. 3. Therefore, the first door 40 and the second door 42 may be moveable relative to the upper hull portion 30 from the closed configuration shown in FIGS. 1-3 to the open configuration shown in FIGS. 6 and 7, thereby facilitating the release of the payload 8 (FIG. 3) from the hull 12 of the deployment vessel 10.

The nose portion 34 of the hull 12 may have a hydrodynamic shape to reduce drag as the deployment vessel 10 moves through water. The nose portion 34 may be hingedly connected to the forward end 22 of the upper hull portion 30. Therefore, the nose portion 34 may be moveable relative to the upper hull portion 30 from the closed configuration shown in FIGS. 1-3 to the open configuration shown in FIGS. 6 and 7, thereby further facilitating the release of the payload 8 (FIG. 3) from the deployment vessel 10.

The tail portion 36 of the hull 12 may be longitudinally opposed from nose portion 34, and may be fixedly connected to the aft end 24 of the upper hull 30. Like the nose portion 34, the tail portion 36 may also have a hydrodynamic shape to reduce drag as the deployment vessel 10 moves through water.

Referring now to FIG. 3, the hull 12 of the deployment vessel 10 may define an internal volume 50. A bulkhead 52 may divide the internal volume 50 into a payload compartment 54 and a utility compartment 56. The bulkhead 52 may be positioned proximate the forward end 22 of the tail portion 36 of the hull 12 such that the utility compartment 56 is defined by the bulkhead 52 and the tail portion 36. The payload compartment 54 may be defined by the bulkhead 52, the upper hull portion 30, the lower hull portion 32 and the nose portion 34.

The utility compartment 56 defined by the hull 12 of the deployment vessel 10 may be substantially (if not absolutely) watertight. Therefore, components of the control system 100 discussed in greater detail herein, such as the controller 102, the pressurized gas source 104 and/or the power source 106, may be housed within the utility compartment 56. Various other apparatus and systems, particularly apparatus and systems sensitive to water contact, may be housed within the utility compartment 56.

The payload 8 may be housed within the payload compartment 54 defined by the hull 12 of the deployment vessel 10. Unlike the watertight utility compartment 56, the payload compartment 54 may flood once the deployment vessel 10 is in contact with water. Indeed, steps may be taken to accelerate the flooding of the payload compartment 54 such that air entrapment within the payload compartment 56 does not interfere with the negative buoyance of the deployment vessel 10. For example, one or more of the upper hull portion 30, the lower hull portion 32 and the nose portion 34 may be formed from a water permeable material, such as a perforated material (e.g., perforated sheet metal) or a mesh material (e.g., metal mesh). However, it is also contemplated that the payload compartment 54 may be watertight, and may only flood during release of the payload 8 from the payload compartment 54.

While the deployment vessel 10 is shown and described having a particularly designed hull 12 featuring a hinged nose portion 34 and a lower hull portion 32 with two doors 40, 42, various alternative hull designs may be used without departing from the scope of the present disclosure. Functionally, the hull 12 of the deployment vessel 10 houses the payload 8 in a payload compartment 54 and also facilitates the release of the payload 8 from the payload compartment 54. Such functionality may alternatively be achieved using only a hinged nose portion 34, or using only the doors 40, 42 of the lower hull portion 32, or using only one door in the hull 12 (not shown), or using three or more doors in the hull 12 (not shown), or using a hinged tail portion 36 (not shown), Referring again to FIGS. 1-3, the ballast 14 of the deployment vessel 10 may be releasably connected to the hull 12, thereby rendering the deployment vessel 10 negatively buoyant (or at least more negatively buoyant than if the ballast 14 were omitted). For example, the ballast 14 may be releasably connected to the nose portion 34 of the hull 12, as shown in the drawings, or otherwise proximate the forward end 22 of the hull 12. Therefore, when in water, the deployment vessel 10 may submerge with the forward end 22 leading the way.

The ballast 14 of the deployment vessel 10 may be formed from any material (or combination of materials) having a density equal to or greater than the density of the water into which the deployment vessel 10 will be deployed. For example, the ballast 14 may be (or may include) a mass of solid or semi-solid material, such a metallic material. Therefore, the ballast 14 may be released by disconnecting the ballast 14 from the hull 12. While the ballast 14 is shown being external of the hull 12, use of an internal ballast 14 is also contemplated.

At this point, those skilled in the art will appreciate that various apparatus and systems may be used as the ballast 14 to render the deployment vessel 10 negatively buoyant, and that an externally connected ballast 14, as shown in the drawings, in only one specific, non-limiting example. It is also contemplated that the ballast 14 may be (or may include) a liquid (e.g., water), and the ballast 14 may be released by discharging (rather than disconnecting) the ballast 14 from the hull 12.

Thus, the ballast 14 may negatively contribute to the buoyancy of the deployment vessel 10. When the ballast 14 is released, the buoyance of the deployment vessel 10 may increase. In one variation, release of the ballast 14 may render the deployment vessel 10 less negatively buoyant (but still negatively buoyant). In another variation, release of the ballast 14 may render the deployment vessel 10 positively buoyant. Therefore, release of the ballast 14 may promote surfacing of the deployment vessel 10.

The ballast 14 may be an optional component of the deployment vessel 10. Those skilled in the art will appreciate that the deployment vessel 10 may be negatively buoyant without the need for a ballast 14. For example, the hull 12 may be constructed from materials of sufficient quantity and density to render the deployment vessel 10 negatively buoyant without the need for a ballast 14. Furthermore, the payload 8 housed within the hull 12 may render the deployment vessel 10 negatively buoyant without the need for a ballast 14.

Referring to FIGS. 1 and 2, the deployment vessel 10 may include one or more control surfaces 16 to control the attitude of the deployment vessel 10 as the deployment vessel 10 moves through water. The control surfaces 16 may ensure that the deployment vessel 10 moves horizontally (arrow H in FIG. 2) as the deployment vessel submerges vertically downward (arrow V in FIG. 2) under the force of gravity. The control surfaces 16 may be connected to the aft end 24 of the hull 12, such as to the tail portion 36 of the hull 12. However, connecting control surfaces 16 at other locations, such as the forward end 22 of the hull 12 or at both the forward end 22 and aft end 24, will not result in a departure from the scope of the present disclosure.

In one particular construction, the deployment vessel 10 may include two control surfaces 16: a rudder 70 and a dive plane 72. Fewer or additional control surfaces 16 may be used without departing from the scope of the present disclosure. The rudder 70 may define the yaw of the deployment vessel 10 and the dive plane 72 may define the pitch of the deployment vessel 10. While in the illustrated embodiment the rudder 70 and the dive plane 72 may be fixed (do not move), a controllable rudder 70, a controllable dive plane 72 or both a controllable rudder 70 and a controllable dive plane 72 may be used without departing from the scope of the present disclosure.

The configuration of the dive plane 72 may dictate the extent to which the deployment vessel 10 moves horizontally (arrow H in FIG. 2) as the deployment vessel submerges vertically downward (arrow V in FIG. 2) under the force of gravity. Therefore, the angle of attack of the dive plane 72 may be a design consideration, and be set to achieve the desired amount of horizontal movement of the deployment vessel 10 for a given amount of vertically downward movement. As one example, the dive plane 72 may be configured to achieve at least about 1 foot of horizontal movement for each 1 foot of vertically downward movement. As another example, the dive plane 72 may be configured to achieve at least about 2 feet of horizontal movement for each 1 foot of vertically downward movement. As yet another example, the dive plane 72 may be configured to achieve at least about 3 feet of horizontal movement for each 1 foot of vertically downward movement.

At this point, those skilled in the art will appreciate that the deployment vessel 10 may move solely under the force of gravity (no propulsion system), and that the attitude of the deployment vessel 10 may dictate the travel path of the deployment vessel 10. However, adding a propulsion system is contemplated and will not result in a departure from the scope of the present disclosure.

The flotation device 18 of the deployment vessel 10 may be connected to the hull 12 and, when deployed, may increase the buoyancy of the deployment vessel 10. Therefore, deployment of the flotation device 18 may promote surfacing of the deployment vessel 10.

Figure 4:
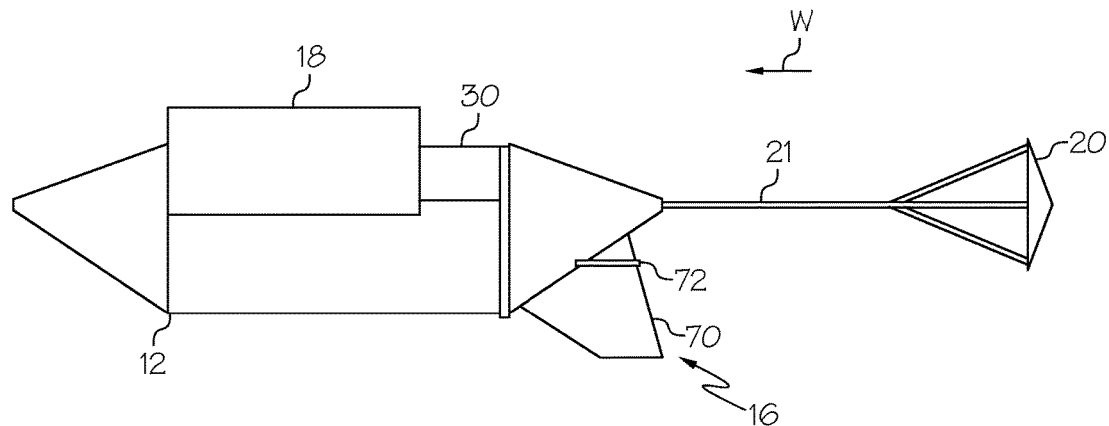
FIG. 4 is a side elevational view of the waterborne payload deployment vessel of FIG. 2, shown in a positively buoyant configuration, but prior to payload deployment.

In one construction, the flotation device 18 may be an inflatable flotation device. For example, as best shown in FIG. 3, the flotation device 18 may be (or may include) a bladder, and may cover all or a portion of the upper hull portion 30 of the hull 12. As shown in FIGS. 4 and 5, in the deployed configuration, the flotation device 18 may be inflated with a gas, such as nitrogen, air or the like. In one alternative construction, the flotation device 18 may be (or may include) pontoons, such as one pontoon on the port side 26 of the hull 12 and one pontoon on the starboard side 28 of the hull 12.

The flotation device 18 may be connected to the upper hull portion 30 of the hull 12. Therefore, when the flotation device 18 is deployed while the deployment vessel 10 is in the water, the flotation device 18 may assist in orienting the deployment vessel 10 on the surface of the water in an upper-hull-portion-up orientation. Furthermore, with the flotation device 18 connected to the upper hull portion 30 of the hull 12, the flotation device 18 may stabilize the deployment vessel 10 on the surface of the water, at least in relatively calm seas.

Thus, the ballast 14 and the flotation device 18 may facilitate controlling the buoyance of the deployment vessel 10, thereby enabling initial submersion of the deployment vessel 10 and subsequent surfacing of the deployment vessel 10. However, use of a ballast 14 and a flotation device 18 is only one specific example. Using only a ballast 14 is another example. Using only a flotation device 18 is yet another example. Other apparatus and systems may be used to render the deployment vessel 10 positively buoyant after an initial period of negative buoyancy, and such a modification will not result in a departure from the scope of the present disclosure.

Referring to FIG. 4, the sea anchor 20 of the deployment vessel 10, while an optional component, may be connected to the hull 12 by a line 21. The sea anchor 20 may be initially stowed, as shown in FIGS. 1-3, such as in a compartment of the hull 12 or against the hull 12. The sea anchor 20 may be deployed (FIG. 4) once the deployment vessel 10 is in water, such as floating on the surface of a body of water. Functionally, the sea anchor 20 may assist in stabilizing the deployment vessel 10 on the surface of a body of water by orienting the deployment vessel 10 with the wind/wave direction (arrow W in FIG. 4).

Figure 8:
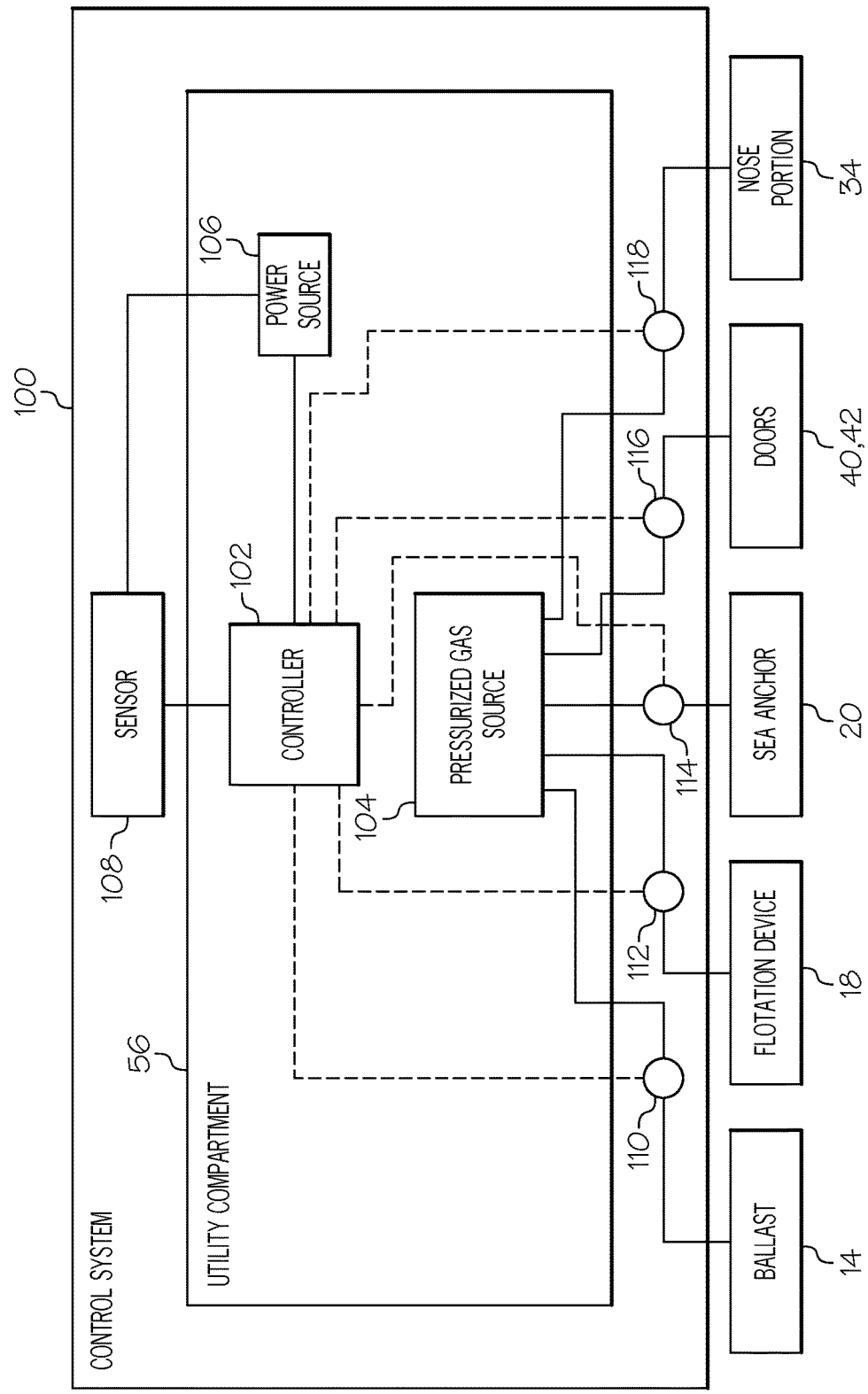
FIG. 8 is a block diagram of the control system of the waterborne payload deployment vessel of FIG. 1.

Referring now to FIG. 8, the deployment vessel 10 (FIG. 1) may be provided with a control system 100. The control system 100 may control various features of the deployment vessel 10, such as release of the ballast 14, deployment of the flotation device 18, deployment of the sea anchor 20, opening of the first and second doors 40, 42 and/or opening of the nose portion 34. While a specific control system 100 is shown and described, those skilled in the art will appreciate that various control systems may be used to effect the release of the ballast 14, deployment of the flotation device 18, deployment of the sea anchor 20, opening of the first and second doors 40, 42 and/or opening of the nose portion 34.

As one specific, non-limiting example, the control system 100 may be pneumatic. Specifically, the control system 100 may include a controller 102, a pressurized gas source 104, a power source 106, a sensor 108 and actuators 110, 112, 114, 116, 118. Actuator 110 may be a pneumatic actuator associated with the ballast 14 (e.g., a pneumatic release), actuator 112 may be a pneumatic actuator associated with the flotation device (e.g., a pneumatic valve), actuator 114 may be a pneumatic actuator associated with the sea anchor 20 (e.g., a pneumatic release), actuator 116 may be a pneumatic actuator associated with the doors 40, 32 (e.g., a pneumatic release), and actuator 118 may be a pneumatic actuator associated with the nose portion 34 (e.g., a pneumatic release).

The controller 102 may be any apparatus or system, such as a computer, capable of receiving a signal from the sensor 108 and communicating command signals to the actuators 110, 112, 114, 116, 118. The controller 102 may be electrically powered by the power source 106, which may be a battery (e.g., a lithium ion battery) or the like. The power source 106 may also electrically power the sensor 108.

The sensor 108 may be any apparatus or system capable of detecting when the deployment vessel 10 is in (or about to be in) water. As one example, the sensor 108 may be (or may include) a seawater sensor (e.g., a capacitance-based seawater sensor). As another example, the sensor 108 may be (or may include) an impact sensor. As another example, the sensor 108 may be (or may include) an altimeter. As yet another example, the sensor 108 may be a device capable of detecting separation of the deployment vessel 10 from a supporting structure (e.g., a parachute or a crane).

When the controller 102 receives a signal from the sensor 108 indicating water contact (or imminent water contact), the controller 102 may initiate an actuation sequence that will result in the release of the ballast 14, deployment of the flotation device 18, deployment of the sea anchor 20, opening of the first and second doors 40, 42 and opening of the nose portion 34. To allow the deployment vessel 10 time to submerge, the actuation sequence may begin with a timed delay. Upon expiration of the timed delay, the controller 102 may communicate actuation signals to the actuators 110, 112, 114, 116, 118.

The pressurized gas source 104 may include a pressure vessel housing a pressurized gas (e.g., air or nitrogen). The pressurized gas source 104 may be in fluid communication with the actuators 110, 112, 114, 116, 118. When an actuator 110, 112, 114, 116, 118 receives an actuation signal, the pressurized gas may effect actuation of the actuator 110, 112, 114, 116, 118. Specifically, when actuator 110 is actuated, the ballast 14 may be released; when actuator 112 is actuated, the flotation device 18 may be filled with gas from the pressurized gas source 104; when actuator 114 is actuated, the sea anchor 20 may be deployed; and when actuators 116, 118 are actuated, the doors 40, 42 and the nose portion 34 may be opened (see FIGS. 6 and 7) to release the payload 8 (FIG. 3).

Figure 9:
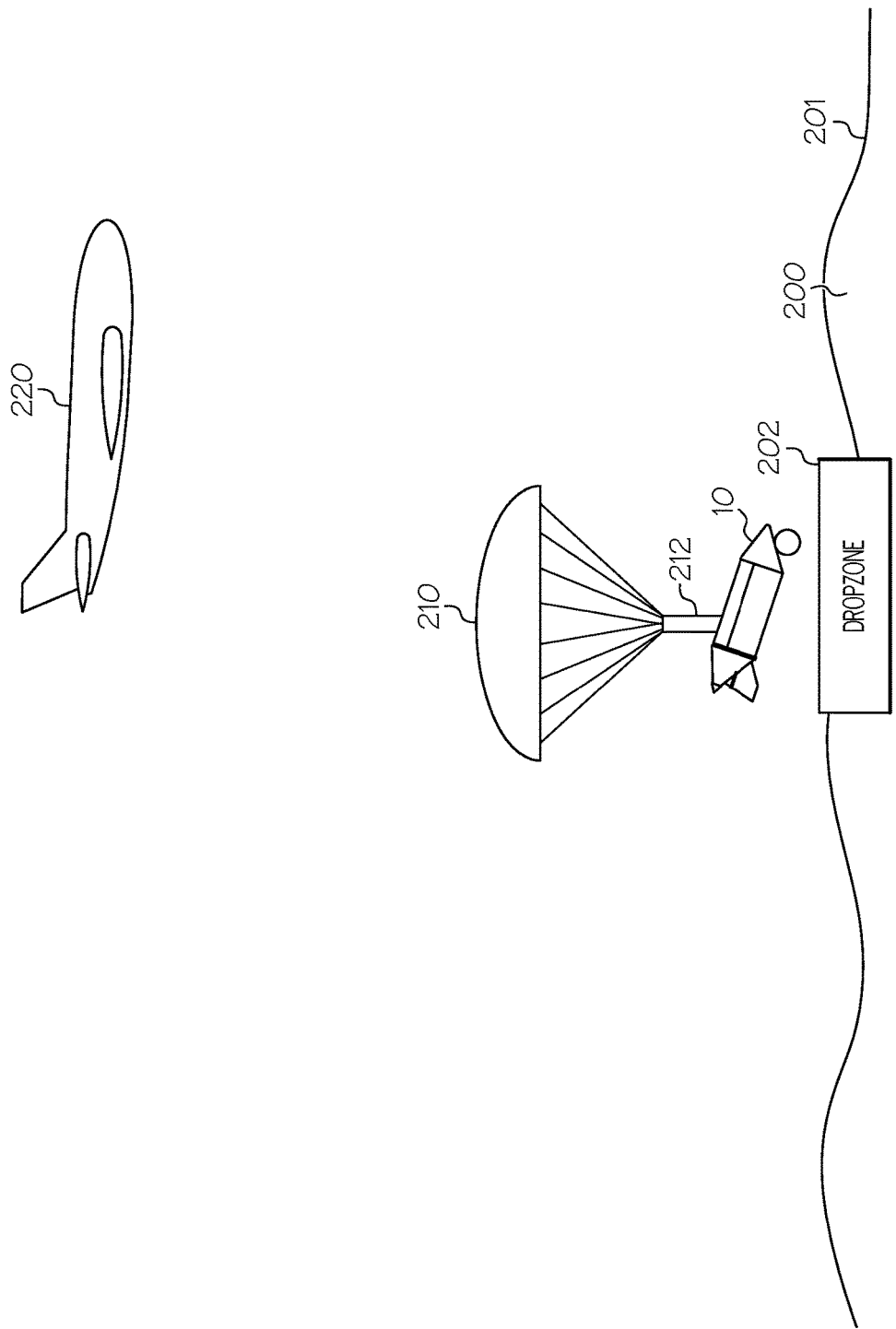
FIG. 9 is a graphical depiction of the waterborne payload deployment vessel of FIG. 1 being deployed from an aircraft into a body of water.

Referring to FIG. 9, the disclosed deployment vessel 10 may be introduced into a body of water 200 at a drop zone 202 (the location the deployment vessel 10 enters the water 200). Various techniques may be used to deploy the deployment vessel 10 into the body of water 200.

In one implementation, the deployment vessel 10 may be connected to a parachute 210 and dropped from a moving vehicle, such as an aircraft 220, as shown in FIG. 9. A parachute release 212 may couple the deployment vessel 10 to the parachute 210, but may decouple the deployment vessel 10 from the parachute 210 upon contact with the surface 201 of the water 200 or when contact with the surface 201 of the water 200 is imminent. For example, the parachute release 212 may be a water activated device, such as a SEAWARS release available from Cobham plc of Dorset, United Kingdom. As another example, the parachute release 212 may be a mechanical, weight-triggered release.

While deployment from an aircraft 220 using a parachute 210 is shown, various other techniques may be used to deploy the disclosed deployment vessel 10 into a body of water 200. As one alternative example, the deployment vessel 10 may simply be dropped into the water 200 as is (e.g., no parachute 210), such as from a watercraft (not shown). As another alternative example, the deployment vessel 10 may be placed in the water 200, such as with a mechanical arm (e.g., a crane) extending from a watercraft.

Figure 10:
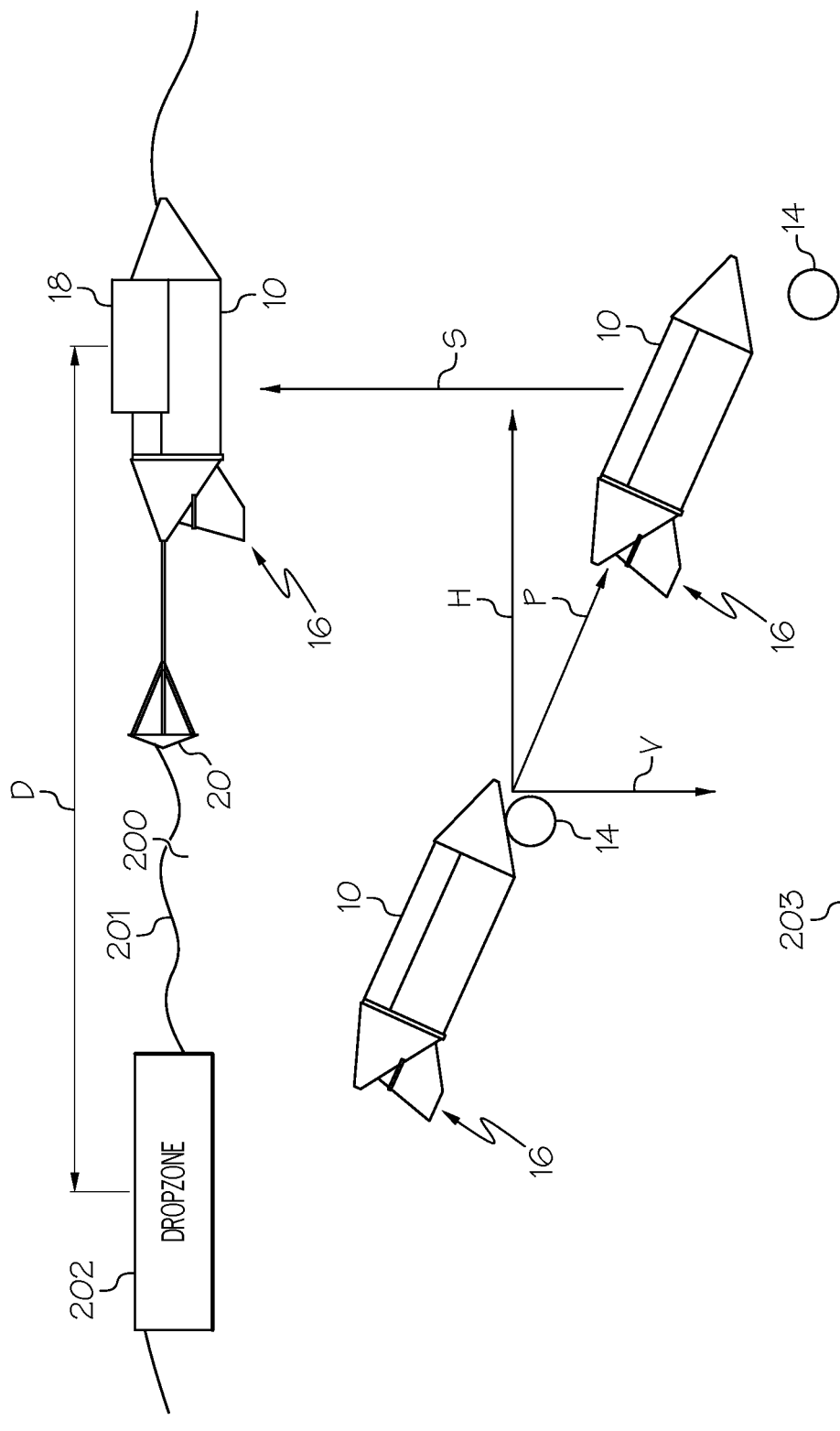
FIG. 10 is a graphical depiction of three phases (egress/buoyancy increase/surface stabilization) of the deployment sequence of the waterborne payload deployment vessel of FIG. 9.

Referring now to FIG. 10, once the deployment vessel 10 enters the water 200, it may begin to submerge due to its negative buoyancy. The payload compartment 54 may rapidly flood with ambient water 200 to facilitate rapid submersion below the surface 201 of the water 200. As the deployment vessel 10 submerges under the force of gravity, it may move both vertically downward (arrow V) and horizontally (arrow H) as it travels along a submersion path (arrow P), thereby egressing the drop zone 202.

The deployment vessel 10 may continue to submerge in the water 200 until a minimum horizontal distance D is established between the drop zone 202 and the deployment vessel 10. In one expression, the deployment vessel 10 may continue to submerge until the horizontal distance D is at least 20 feet. In another expression, the deployment vessel 10 may continue to submerge until the horizontal distance D is at least 50 feet. In yet another expression, the deployment vessel 10 may continue to submerge until the horizontal distance D is at least 100 feet.

The minimum horizontal distance D may be established based on a predetermined elapsed time measured from the time the deployment vessel 10 enters the drop zone 202. The elapsed time required to establish a particular minimum horizontal distance D may be a function of, among other factors, the magnitude of the predetermined minimum horizontal distance D, the buoyancy of the deployment vessel 10, the attitude (e.g., angle of attach of the dive plane 72 (FIG. 1)) of the deployment vessel 10 as it submerges and the depth of the water 200. As one non-limiting example, the deployment vessel 10 may be allowed to submerge for at least about 5 seconds (the elapsed time). As another non-limiting example, the deployment vessel 10 may be allowed to submerge for at least about 30 seconds (the elapsed time). As yet another non-limiting example, the deployment vessel 10 may be allowed to submerge for at least about 1 minute (the elapsed time).

Still referring to FIG. 10, after the minimum horizontal distance D is established between the drop zone 202 and the deployment vessel 10, the buoyancy of the deployment vessel 10 may be changed from a negative buoyancy to a positive buoyancy, thereby surfacing the deployment vessel 10, as shown in FIG. 10 by arrow S. The buoyancy of the deployment vessel 10 may be changed from a negative buoyancy to a positive buoyancy by releasing the ballast 14 and deploying (e.g., inflating) the flotation device 18, though, as noted herein, alternative techniques are also contemplated. On the surface 201 of the water 200, the deployment vessel 10 may be stabilized by the flotation device 18 and the sea anchor 20.

Figure 11:
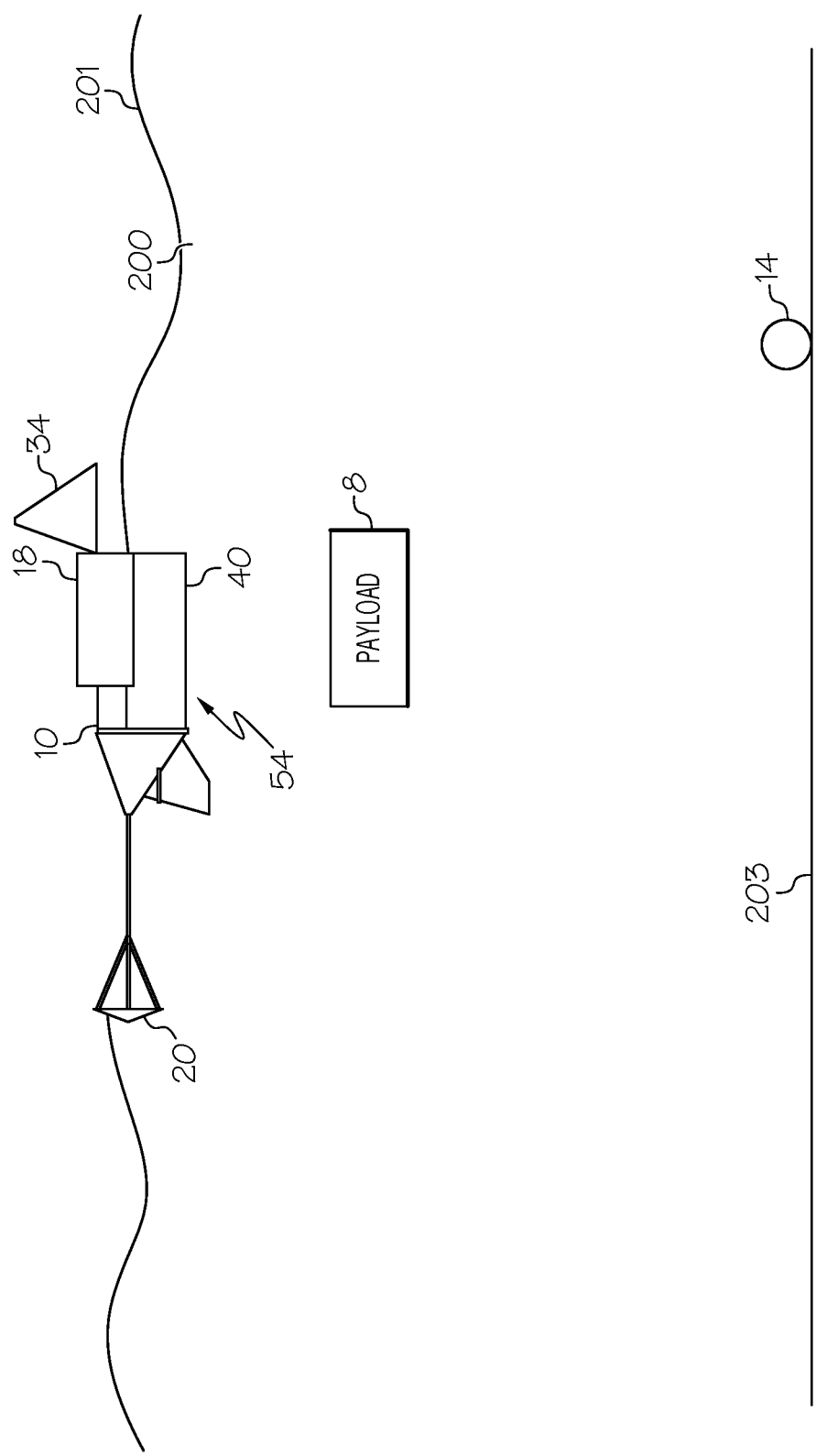
FIG. 11 is a graphical depiction of another phase (payload deployment) of the deployment sequence of the waterborne payload deployment vessel of FIG. 10.

As shown in FIG. 11, with the deployment vessel 10 on the surface 201 of the water 200 and stabilized by the flotation device 18 and the sea anchor 20, the hull 12, specifically the nose portion 34 and the first and second doors 40, 42 (FIG. 7) of the hull 12, may be opened, thereby releasing the payload 8 from the payload compartment 54 into the water 200. The payload 8 may be deemed deployed in the water 200 once it exits the payload compartment 54 of the deployment vessel 10.

After the payload 8 has been deployed, the deployment vessel 10 may be retrieved for reuse. Alternatively, the deployment vessel 10 may be scuttled, such as with a pyrotechnic device or by allowing the flotation device 18 to deflate and the deployment vessel 10 to sink to the bottom 203 of the body of water 200.

Figure 12:
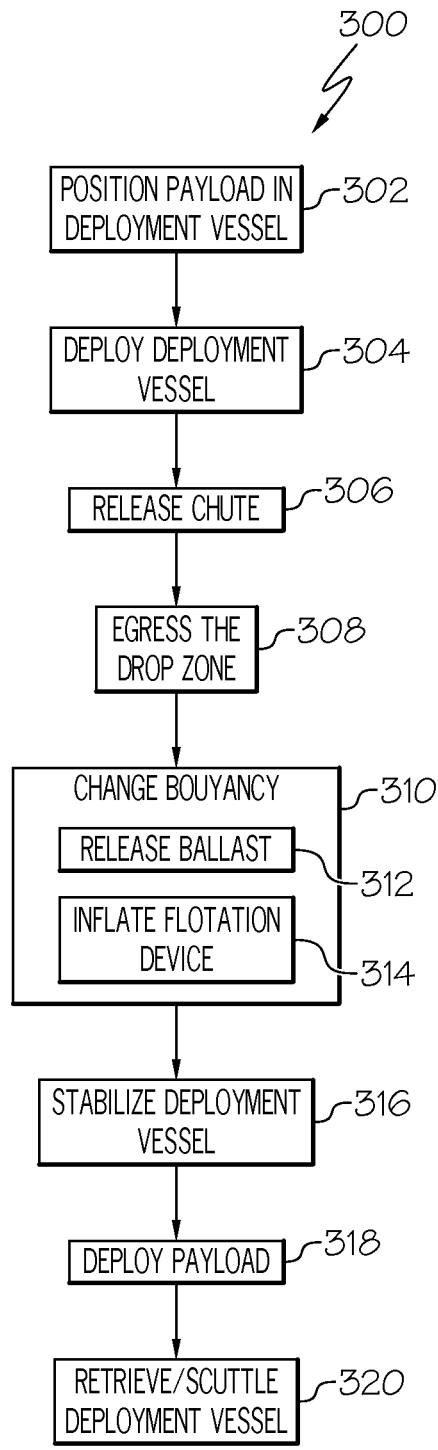
FIG. 12 a flow diagram depicting one embodiment of the disclosed waterborne payload deployment method.

Referring now to FIG. 12 (with occasional reference to the previously-discussed figures), one embodiment of the disclosed waterborne payload deployment method, generally designated 300, may begin at Block 302 with the step of positioning a payload 8 in a deployment vessel 10, as shown in FIG. 3. The deployment vessel 10 may have a hull 12 that defines a payload compartment 54, and the payload 8 may be positioned in the payload compartment 54. The deployment vessel 10 may provide closeable access to the payload compartment 54 by way of, for example, doors 40, 42 and a hinged nose portion 34.

At Block 304, the deployment vessel 10 (including the payload 8) may be deployed into a body of water 200, as shown in FIG. 9. For example, the deployment vessel 10 may be dropped from an aircraft 220 into the body of water 200. A parachute 210 may be connected to the deployment vessel 10 to reduce the impact when the falling deployment vessel 10 contacts the surface 201 of the water 200. Alternatively, the deployment vessel 10 may be deployed into the water 200 from a watercraft (not shown). The deployment vessel 10 may be dropped from the watercraft into the water 200, may be slid from the watercraft into the water 200 (e.g., on a chute), or may be placed from the watercraft into the water 200 (e.g., by a mechanical arm).

At Block 306, when a parachute 210 is used, the parachute 210 may be released from the deployment vessel 10. The release of the parachute 210 may occur upon contact with the water 200 or when water contact is imminent (e.g., several feet above the surface 201 of the water 200). As shown in FIG. 9, a parachute release 212 may couple the deployment vessel 10 to the parachute 210, and may effect separation of the deployment vessel 10 from the parachute 210 upon contact with the water 200.

At Block 308, the deployment vessel 10 may egress the drop zone 202, as shown in FIG. 10. Specifically, once in the water 200, may deployment vessel 10 may begin to submerge under the force of gravity. As the deployment vessel 10 submerges, control surfaces 16 on the deployment vessel 10 may ensure that the deployment vessel 10 moves horizontally (arrow H) as it submerges vertically downward (arrow V) under the force of gravity, thereby creating horizontal distance D between the drop zone 202 and the deployment vessel 10.

At Block 310, once a predetermined minimum horizontal distance D is established between the drop zone 202 and the deployment vessel 10, the buoyancy of the deployment vessel 10 may be changed from negative to positive, thereby causing the deployment vessel 10 to rise to the surface 201 of the water 200. As one example, at Block 312, a ballast 14 may be released from the hull 12, as shown in FIG. 10, thereby increasing the buoyancy of the deployment vessel 10. Release of the ballast 14 may render the deployment vessel 10 positively buoyant or at least less negatively buoyant. As another example, at Block 314 a flotation device 18 may be deployed (e.g., inflated), thereby increasing the buoyancy of the deployment vessel 10. Deployment of the flotation device 18 may render the deployment vessel 10 positively buoyant or at least less negatively buoyant.

At Block 316, the deployment vessel 10, which may now be positively buoyant, may be stabilized on the surface 201 of the water 200. The flotation device 18 may facilitate stabilizing the deployment vessel 10 on the surface 201 of the water 200. Additionally, a sea anchor 20 may be deployed to stabilize the deployment vessel 10 on the surface 201 of the water 200.

At Block 318, the payload 8 may be deployed from the deployment vessel 10, as shown in FIG. 11. The payload 8 may be deployed by opening a portion of the hull 12 of the deployment vessel 10 to provide access to the payload department 54. For example, the nose portion 34 and the first and second doors 40, 42 (FIG. 7) of the hull 12, may be opened, thereby releasing the payload 8 from the payload compartment 54 into the water 200.

At Block 320, the deployment vessel 10, now without the payload 8, may be retrieved, such as by sending a watercraft to collect the deployment vessel 10 from the surface 201 of the water 200. Alternatively, the deployment vessel 10 may be scuttled, such as with a pyrotechnic device or by allowing the flotation device 18 to deflate and the deployment vessel 10 to sink to the bottom 203 of the body of water 200.

Accordingly, the disclosed deployment vessel 10 and method 300 may be used to deploy a payload 8 into a body of water 200 using various moving vehicles, such as aircraft and watercraft. Significantly, by promptly egressing the drop zone 202, risk to the payload 8, such as due to parachute entanglement or contact with the deploying watercraft, is mitigated.

Although various embodiments of the disclosed waterborne payload deployment vessel and method have been shown and described, modifications may occur to those skilled in the art upon reading the specification. The present application includes such modifications and is limited only by the scope of the claims.

What is claimed is:

1. A method for deploying a payload into a body of water using a deployment vessel, said deployment vessel comprising a hull defining a payload compartment, said hull comprising an upper hull portion, a lower hull portion and a nose portion, wherein said lower hull portion comprises a door, and wherein said nose portion is hingedly connected to said upper hull portion, said method comprising:
   positioning said payload in said payload compartment of said deployment vessel, said deployment vessel and said payload having a buoyancy, wherein said buoyancy is initially negative;
   deploying said deployment vessel into said water at a drop zone, wherein said deployment vessel moves horizontally through said water as it submerges vertically downward under a force of gravity;
   changing said buoyancy to positive after a minimum horizontal distance is established between said drop zone and said deployment vessel, thereby causing said deployment vessel to surface; and
   after said surfacing of said deployment vessel, opening said door and moving said nose portion relative to said upper hull portion to release said payload from said hull.

2. The method of claim 1 wherein said deploying said deployment vessel into said water comprises dropping said deployment from a moving vehicle.

3. The method of claim 2 wherein said moving vehicle is an aircraft.

4. The method of claim 1 wherein said deployment vessel is connected to a parachute during deployment into said water.

5. The method of claim 4 further comprising releasing said deployment vessel from said parachute in response to said deployment vessel contacting said water.

6. The method of claim 1 wherein said deployment vessel further comprises a control surface connected to said hull.

7. The method of claim 1 wherein said deployment vessel moves horizontally at least about 1 foot for each foot that said deployment vessel submerges vertically downward.

8. The method of claim 1 wherein said deployment vessel moves horizontally at least about 2 feet for each foot that said deployment vessel submerges vertically downward.

9. The method of claim 1 wherein said deployment vessel further comprises a ballast, and wherein said changing said buoyancy comprises releasing said ballast.

10. The method of claim 1 wherein said deployment vessel further comprises a flotation device, and wherein said changing said buoyancy comprises deploying said flotation device.

11. The method of claim 10 wherein said deploying said flotation device comprises inflating said flotation device with a gas.

12. The method of claim 1 wherein said minimum horizontal distance is at least 20 feet.

13. The method of claim 1 wherein said minimum horizontal distance is established based on a predetermined elapsed time measured from a time when said deployment vessel enters said drop zone.

14. The method of claim 1 further comprising deploying a sea anchor.

15. The method of claim 1 further comprising scuttling said deployment vessel after said payload is released from said hull.

16. The method of claim 1 wherein said payload compartment floods upon said deploying said deployment vessel into said water.

17. The method of claim 1 wherein at least one of said upper hull portion, said lower hull portion and said nose portion is formed from a water permeable material.

18. The method of claim 1 wherein said minimum horizontal distance is at least 50 feet.

19. The method of claim 1 wherein said minimum horizontal distance is at least 100 feet.

20. The method of claim 1 wherein said movement of said deployment vessel through said water occurs without the aid of a propulsion system.

* * * * *